US011117283B2

(12) United States Patent
Tommasi

(10) Patent No.: US 11,117,283 B2
(45) Date of Patent: Sep. 14, 2021

(54) MACHINE FOR CUTTING TO SIZE ROLLS OF PREDEFINED LENGTH FROM LOGS WITH A GREATER LENGTH

(71) Applicant: O.M.T. S.R.L., Massa e Cozzile (IT)

(72) Inventor: Marcello Tommasi, Massa E Cozzile (IT)

(73) Assignee: O.M.T. S.R.L., Massa e Cozzile (IT)

( * ) Notice: Subject to any disclaimer, the term of this patent is extended or adjusted under 35 U.S.C. 154(b) by 0 days.

(21) Appl. No.: 16/476,372

(22) PCT Filed: Dec. 12, 2017

(86) PCT No.: PCT/IB2017/057838
§ 371 (c)(1),
(2) Date: Jul. 8, 2019

(87) PCT Pub. No.: WO2018/109658
PCT Pub. Date: Jun. 21, 2018

(65) Prior Publication Data

US 2020/0223089 A1 Jul. 16, 2020

(30) Foreign Application Priority Data

Dec. 13, 2016 (IT) ........................ 102016000125579
Dec. 13, 2016 (IT) ........................ 102016000125746

(51) Int. Cl.

| | |
|---|---|
| ***B62D 7/06*** | (2006.01) |
| ***B26D 7/06*** | (2006.01) |
| *B26D 3/16* | (2006.01) |
| *B26D 7/02* | (2006.01) |
| *B26D 7/01* | (2006.01) |

(52) U.S. Cl.
CPC ......... *B26D 7/0625* (2013.01); *B26D 7/0683* (2013.01); *B26D 3/16* (2013.01); *B26D 7/02* (2013.01); *B26D 2007/013* (2013.01); *B26D 2210/11* (2013.01); *Y10T 83/2096* (2015.04); *Y10T 83/2192* (2015.04); *Y10T 83/6552* (2015.04); *Y10T 83/6555* (2015.04)

(58) Field of Classification Search
CPC . Y10T 83/04; Y10T 83/0524; Y10T 83/0543; Y10T 83/162; Y10T 83/175; Y10T 83/178; Y10T 83/2044; Y10T 83/2074; Y10T 83/2092; Y10T 83/2094; Y10T 83/2096; Y10T 83/2098; Y10T 83/21; Y10T 83/2192; Y10T 83/444; Y10T 83/4458; Y10T 83/4463; Y10T 83/485; Y10T 83/505; Y10T 83/525; Y10T 83/647; Y10T 83/6552; Y10T 83/6555; B26D 7/0625; B26D 7/0683; B26D 7/02; B26D 7/00; B26D 3/16; B26D 2007/013; B26D 2210/11
See application file for complete search history.

(56) References Cited

U.S. PATENT DOCUMENTS 5,458,033 A * 10/1995 Wierschke ............... B26D 3/16
198/471.1
7,946,205 B2 * 5/2011 Benvenuti ............ B26D 7/0683
83/104

(Continued)

*Primary Examiner* — Phong H Nguyen

(57) ABSTRACT

Machine for cutting to size rolls with a defined length from logs having a greater length using a conveyor belts to drive the log to a cutting blade. Photocells are used to determine the length of the longs and to assist with the overall workings of the machine.

24 Claims, 7 Drawing Sheets

(56) References Cited

U.S. PATENT DOCUMENTS

| | | | | |
|---|---|---|---|---|
| 2002/0000400 | A1* | 1/2002 | Biagioni | B26D 7/1854<br>209/620 |
| 2006/0162517 | A1* | 7/2006 | Perini | B26D 3/161<br>83/37 |

* cited by examiner

PRIOR ART

MACHINE FOR CUTTING TO SIZE ROLLS OF PREDEFINED LENGTH FROM LOGS WITH A GREATER LENGTH

The present invention relates to a machine for cutting to size rolls from logs having a greater length than the single rolls.

It is known in the technical sector relating to the production of rolls cut to size, such as rolls of toilet paper or absorbent paper for various uses, that the same are obtained from a complete log with a predefined axial length which is fed, in a feeding direction, which is conventionally longitudinal, towards a cutting blade arranged in the transverse direction and operated by programming and control devices which cause the cut to be performed depending on the sizes defined for each final roll.

It is also known that the length of the single logs is determined by the length of a main log from which the single logs are obtained and is normally equal to a multiple of the length of each roll which must be obtained by means of successive cuts of the said log.

Both owing to the fact that this log length is normally not precise, thus altering the multiple value, and because the opposite leading and trailing ends of the logs, or "trims", in the longitudinal feeding direction, do not have a high finishing quality, these trims must be eliminated by cutting them off and discharging them from the machine to avoid them being conveyed towards the following packaging apparatus.

Figure 1A:
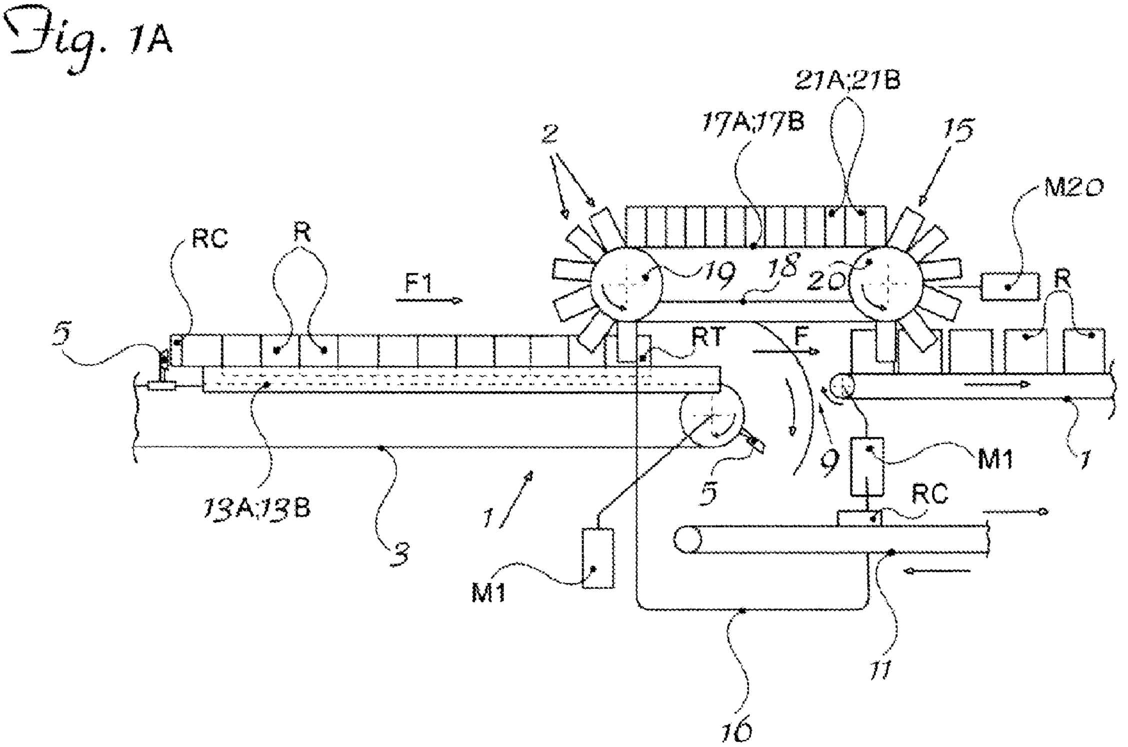
Figure 1B:
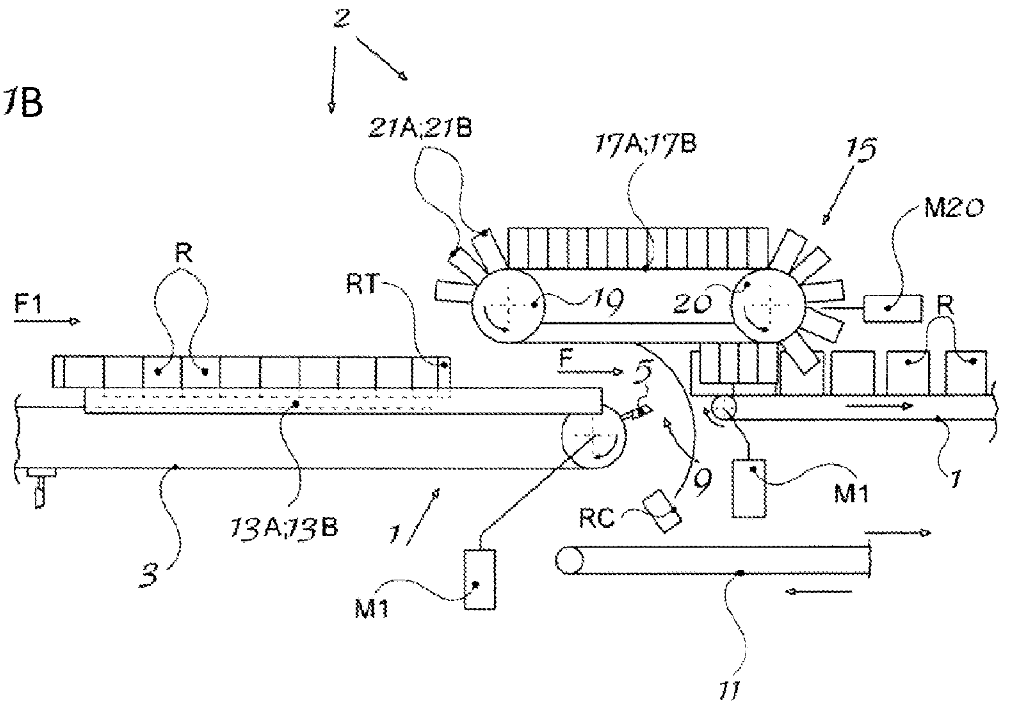

In this connection apparatus which perform this task are known, for example those described in WO2012/156477 and shown in FIGS. 1A and 1B, these apparatus, although performing their function, having a number of drawbacks due to the following factors:

the presence of vanes 5 for pushing the logs, fastened to an endless rotationally driven chain 1 which causes them to advance, by means of the pushing force, in the longitudinal direction along an outward path, followed by an idle return path in the opposite direction; the vanes, which have a transverse dimension depending on the diameter of the log to be fed forwards, therefore require a certain amount of empty space in the longitudinal direction in order to be able to reverse their direction of movement (FIG. 1A), resulting in both a series of empty cutting strokes performed by the cutting blade and, downstream, the need for a complex apparatus 2 for picking up the single cut rolls and conveying them beyond the empty space 9 between the feeding chain 1 and the discharge chain 7;

the pushing vanes are fastened to chains, the longitudinal length of which gives rise to tensioning and jamming;

the log is cut during its advancing movement in the longitudinal direction, resulting in the need for complicated mechanisms for synchronized movement of the cutting blade so as to produce straight cuts;

the rolls are not axially compacted together during cutting of the leading and trailing trims of the log, this causing deformation of the first and last rolls which reduces the quality of the final product, resulting in production rejects;

in order to carry out a change of format, it is required to adjust the structural parts of the machine, increasing further the downtime thereof and therefore the production costs;

all these factors, in addition to creating high production, assembly and maintenance costs, also give rise to undesirable production downtime with a consequent increase in the cost of the single finished roll to be conveyed away for packaging.

Furthermore, a length of the log to be cut which does not correspond to the predefined length results in the need to adapt one or more of the cutting and configurational parameters of the machine in order to ensure the desired characteristics of the cut rolls and/or the desired productivity and quality.

A further example of the prior art is described in EP 0,668,132.

CN 104290122 also discloses a discharging apparatus applicable to a machine for cutting rolls from logs and able to ensure the selective discarding of the trims of the log cut into rolls; the known apparatus, however, does not allow quick and low-cost changes in format when there is a variation in diameter of the logs being machined.

The technical problem which is posed, therefore, is that of providing a machine for cutting to size rolls from logs which is able to solve the problems of the prior art and in particular ensure an improved versatility in the management of the cutting cycles.

It is also preferable that the machine should be able to be provided with a device for selectively discharging the trims of the logs which are easy to implement and allow an easy and rapid change of format.

In connection with this problem it is also required that this machine should be easy and inexpensive to produce and assemble, with a simplified structure which can be easily installed at any user location using standardized means.

These results are achieved according to the present invention by a machine for cutting to size rolls of predefined length from logs with a greater length according to the herein described subject matter.

Figure 2:
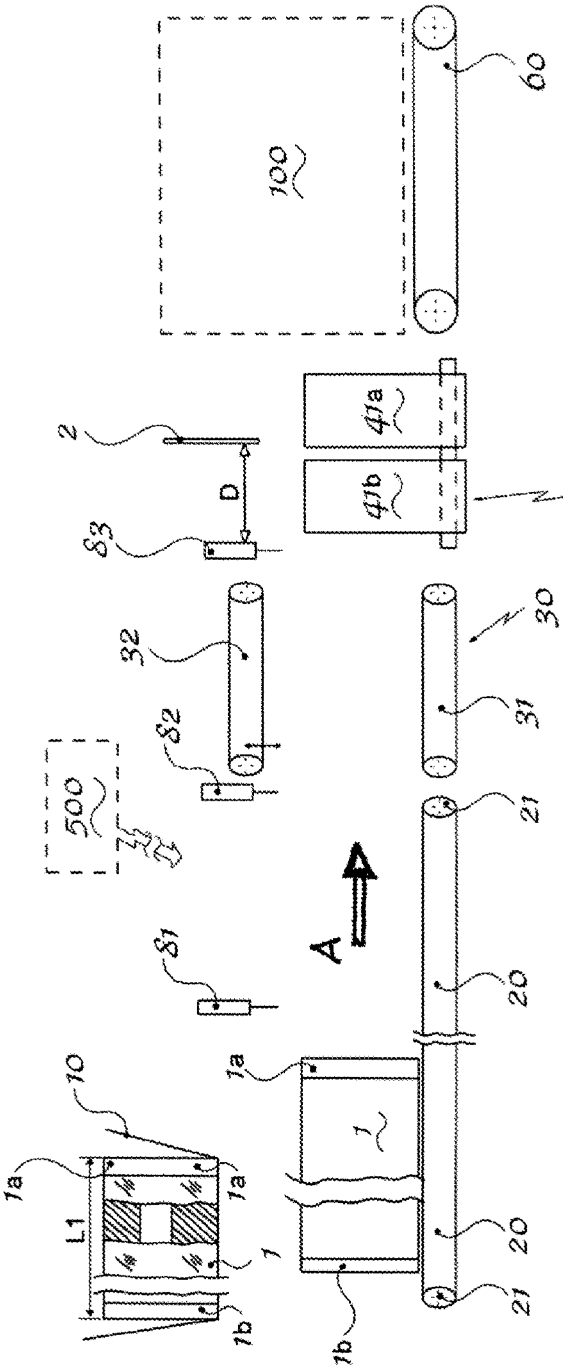
Figure 3:
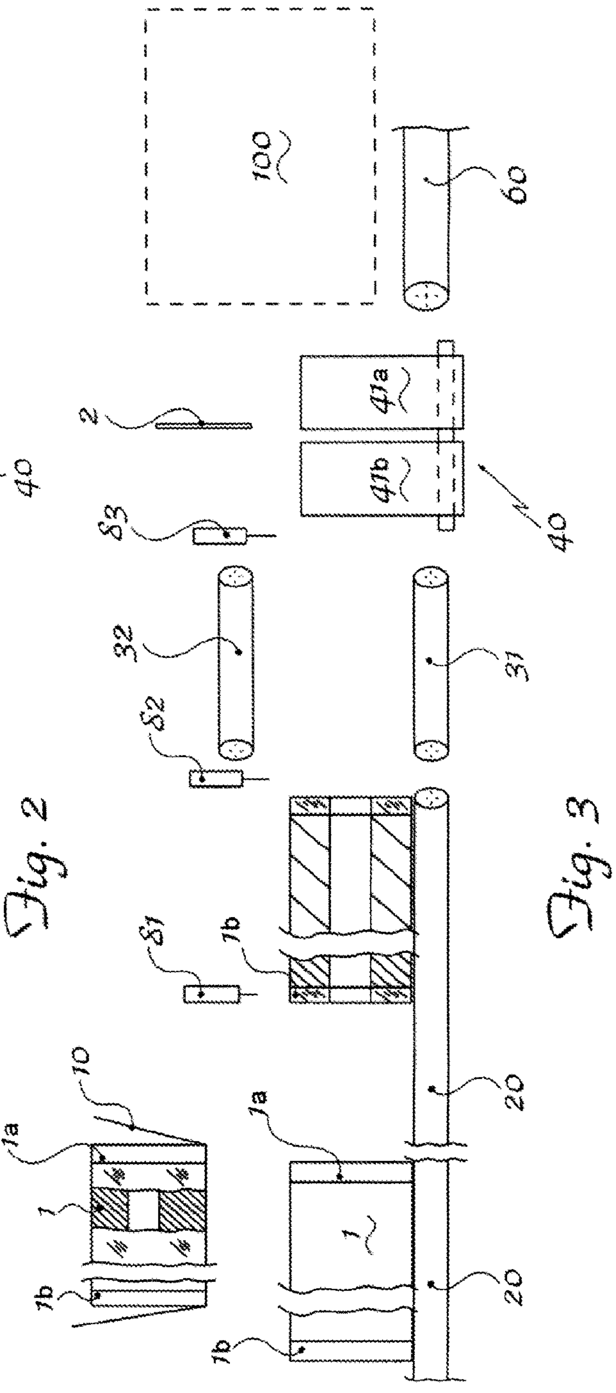
Figure 4:
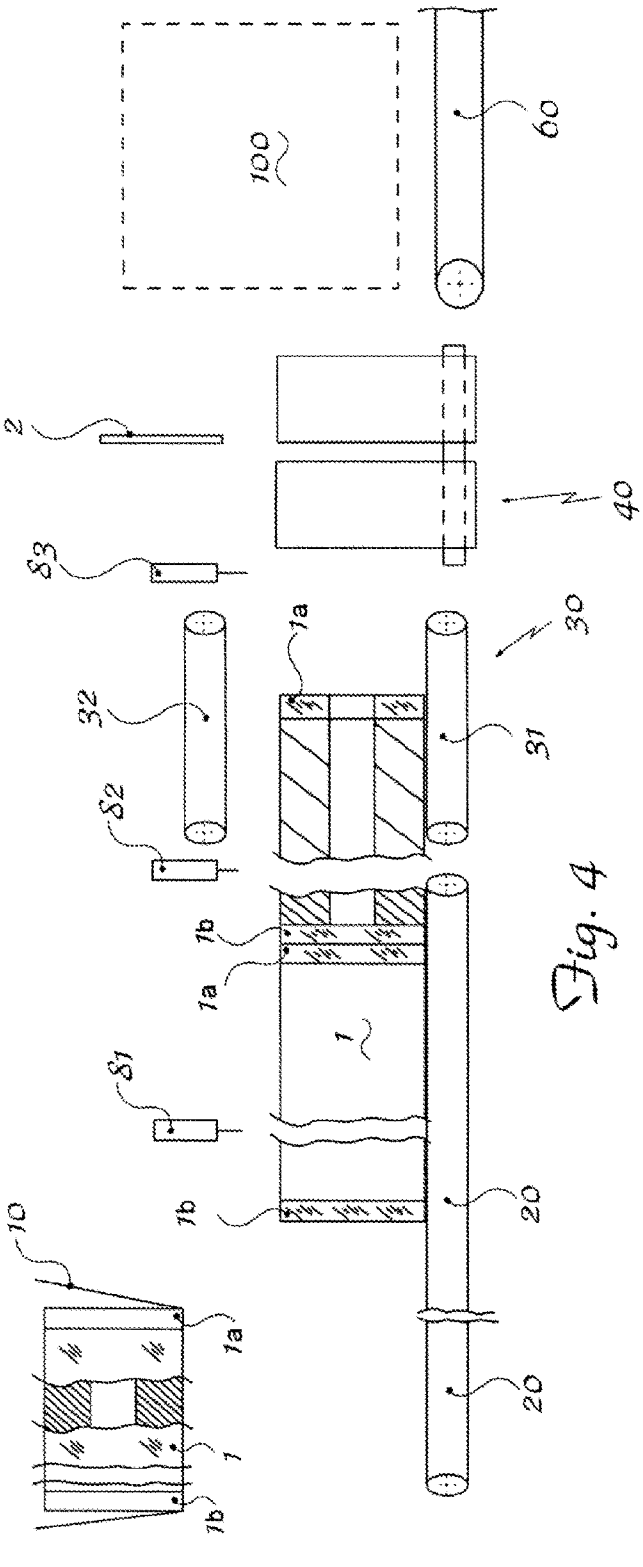
Figure 5:
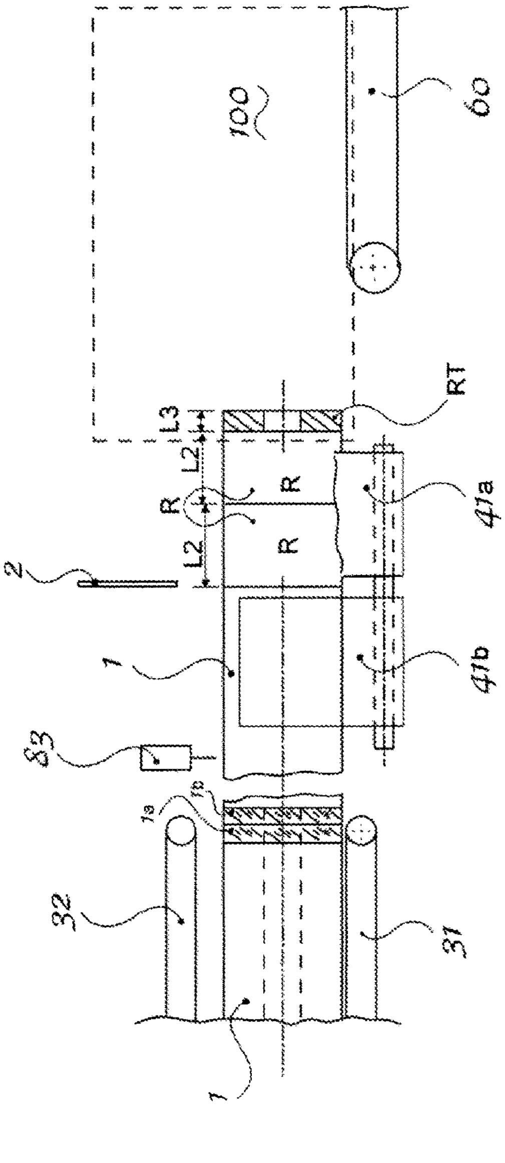
Figure 6:
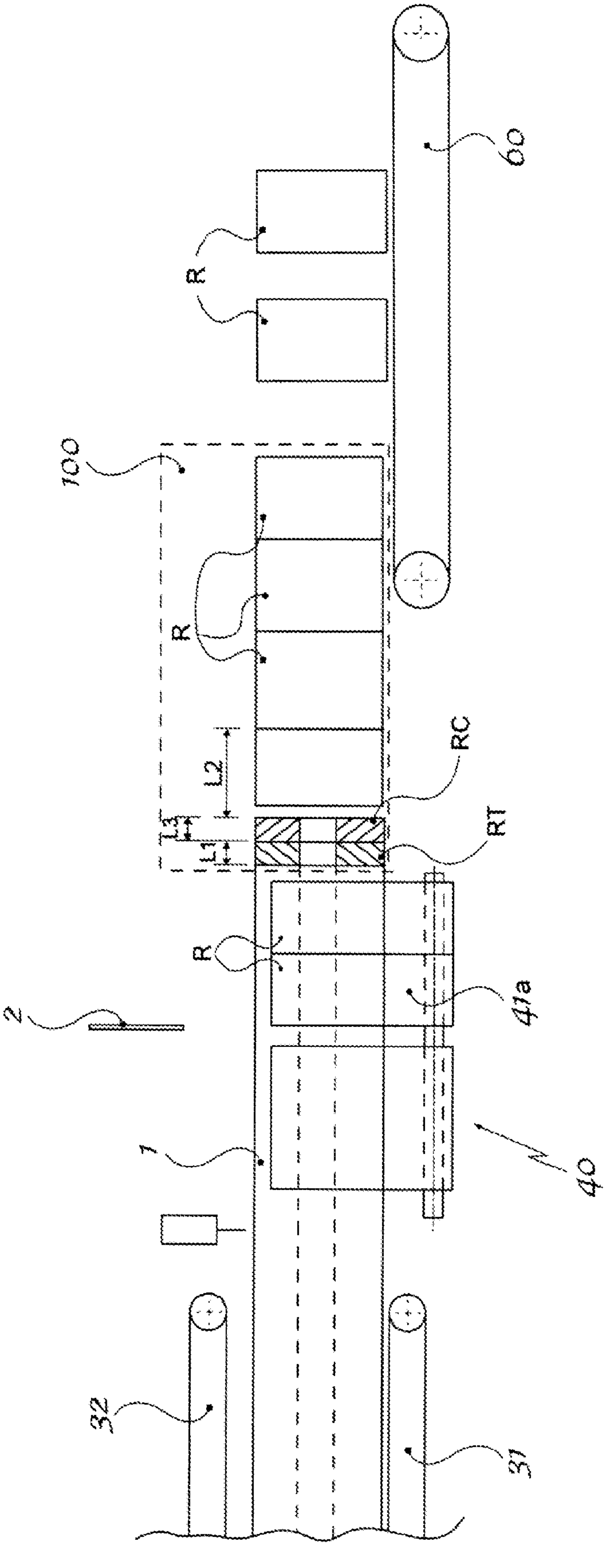
Figure 7:
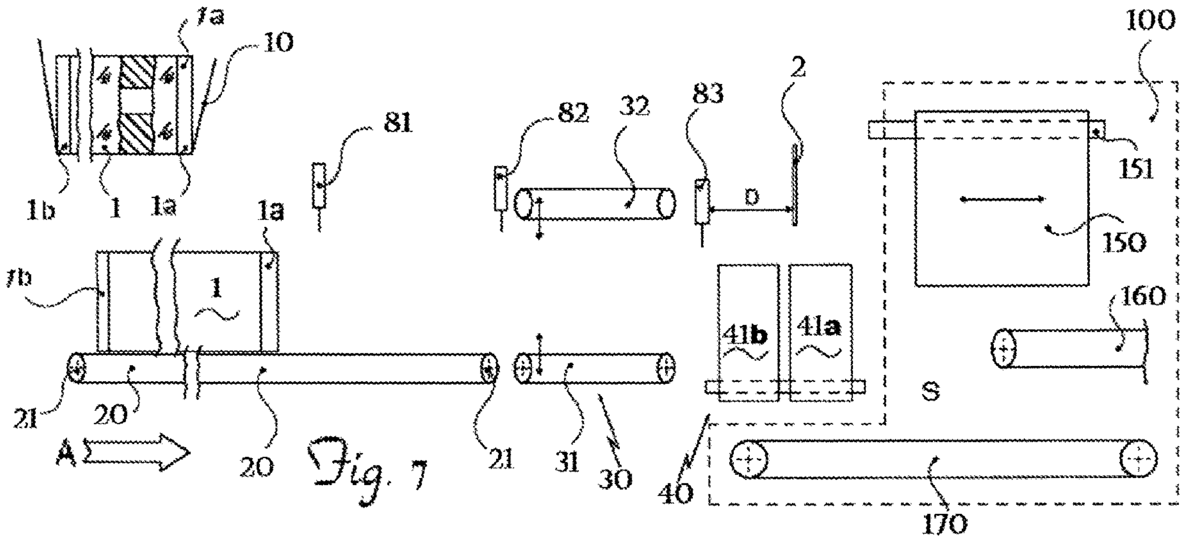
Figure 8:
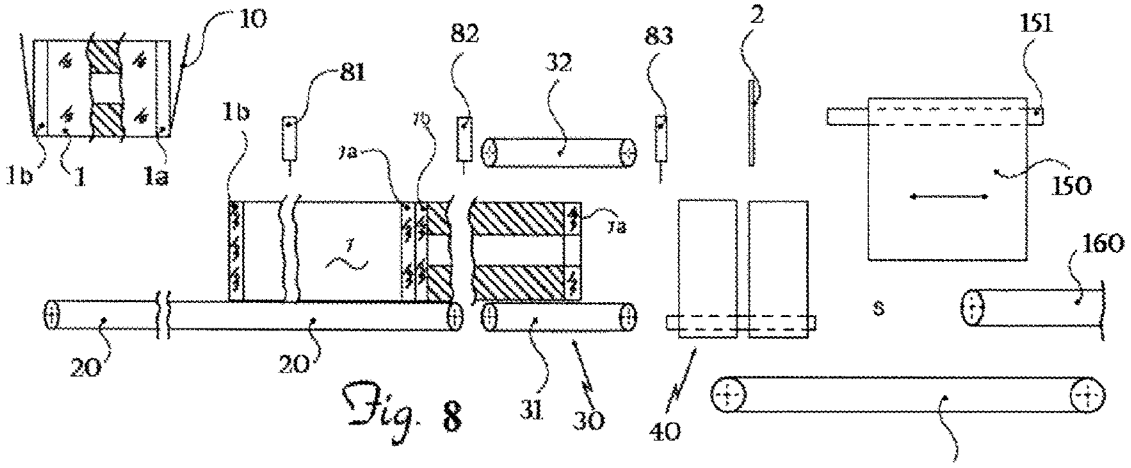
Figure 9:
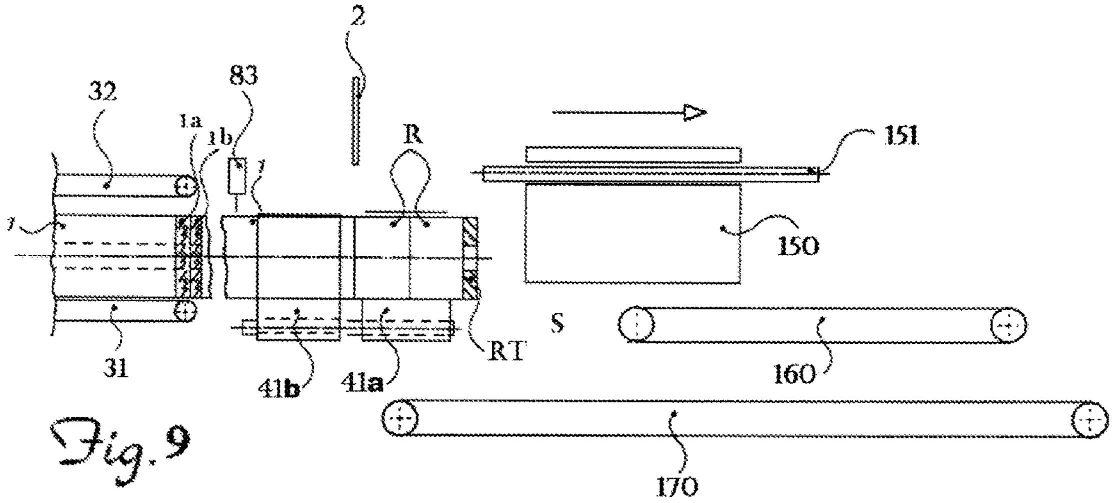
Figure 10:
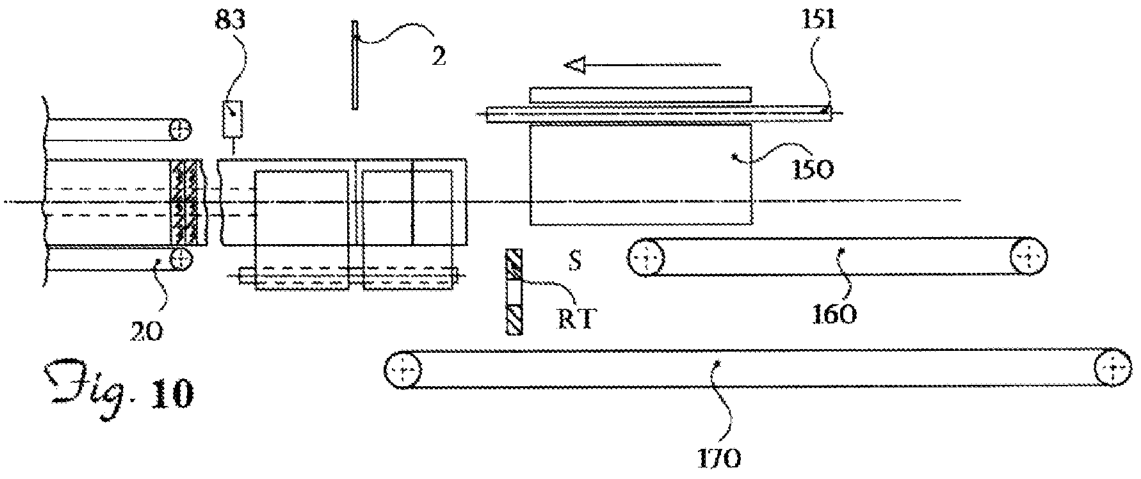
Figure 11:
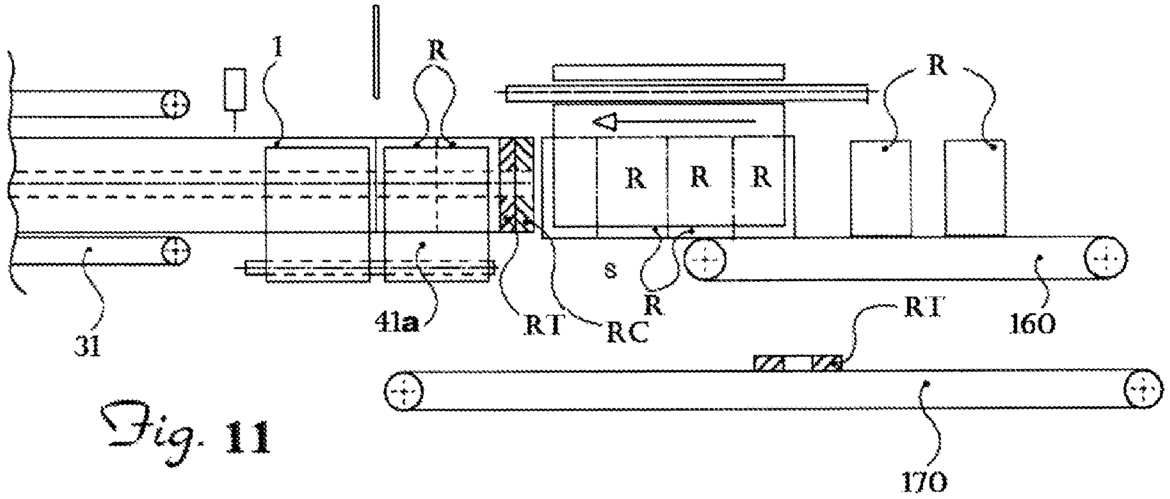
Figure 12:
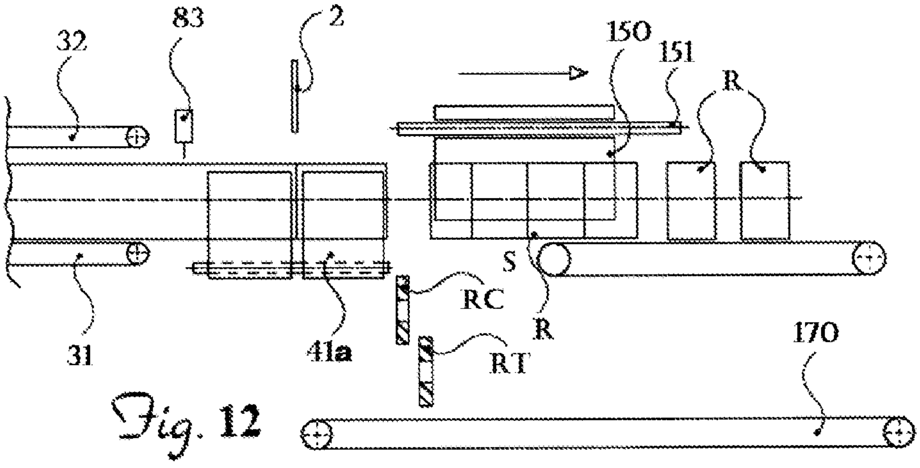
Figure 13:
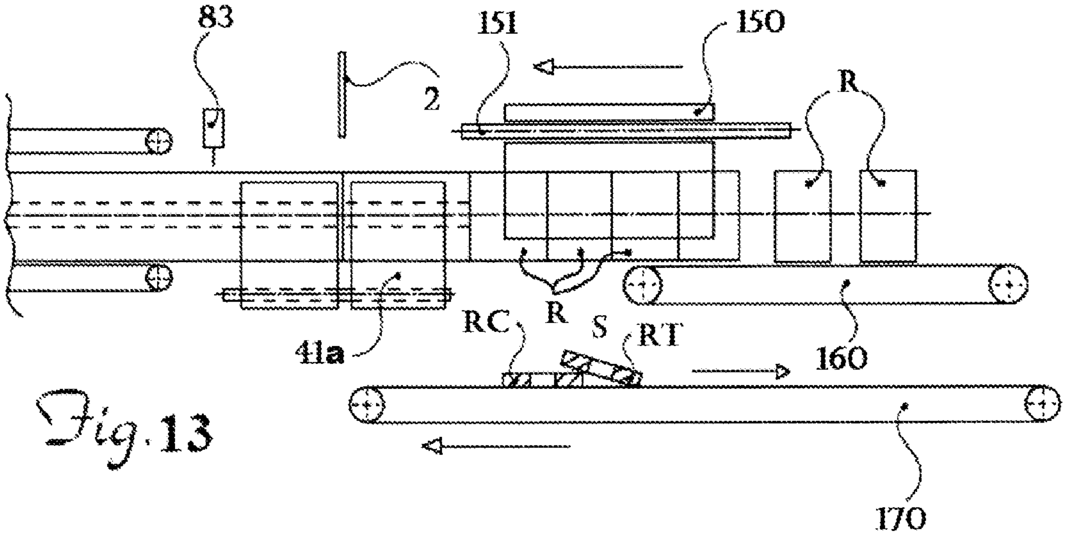
Figure 14:
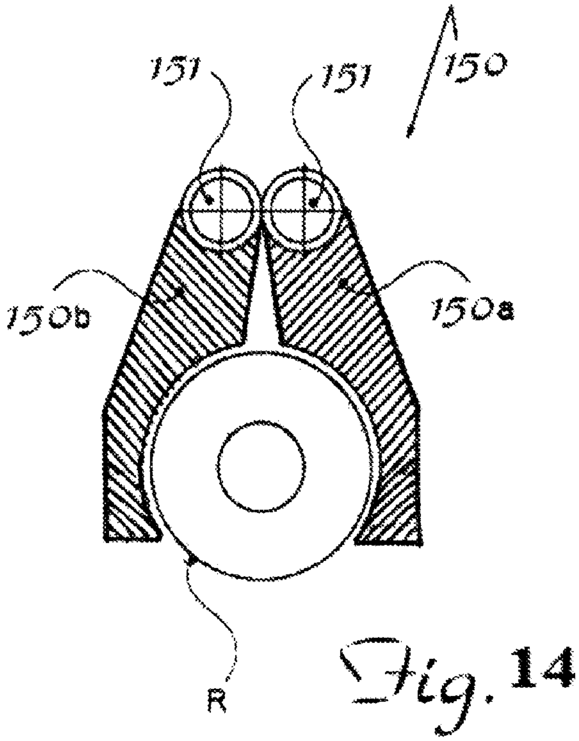

Further details may be obtained from the following description of a non-limiting example of embodiment of the subject of the present invention, provided with reference to the accompanying drawings, in which:

FIGS. 1A, 1B: show side views of a machine according to the prior art;

FIG. 2: shows a schematic side view of an example of embodiment of a machine according to the invention during the start of a cycle with a first log;

FIG. 3: shows a view similar to that of FIG. 2 with a first log advancing and a following log being supplied;

FIG. 4: shows a view similar to that of FIG. 2 with the first and second logs joined together in the longitudinal direction and advancing;

FIG. 5: shows a view similar to that of FIG. 2 with a leading trim of the first log in the discharge zone and FIG. 6: shows a view similar to that of FIG. 2 with the trailing trim of the first log and leading trim of the second log in the discharge zone and rolls cut to size being conveyed away for the following packaging operations;

FIG. 7: shows a schematic side view of an example of embodiment of a device for selectively discharging trims according to the invention applied to a machine during the start of a cycle with a first log;

FIG. 8: shows a view similar to that of FIG. 7 with the first and second logs joined together and advancing;

FIG. 9: shows a view similar to that of FIG. 7 with a leading trim of the first log in the discharge zone;

FIG. 10: shows a view similar to that of FIG. 7 with a leading trim of the first log being discharged;

FIG. 11: shows a view similar to that of FIG. 7 with a trailing trim of the first log and leading trim of the second log in the discharge zone;

FIG. 12: shows a view similar to that of FIG. 7 with a trailing trim of the first log and leading trim of the second log being discharged;

FIG. 13: shows a view similar to that of FIG. 7 with rolls cut to size being conveyed away for the following packaging operations; and FIG. 14: shows a cross-sectional view of a preferred embodiment of the longitudinally displaceable connecting element.

As shown in FIG. 2 and assuming solely for the sake of easier description and without a limiting meaning: a set of three reference axes in a longitudinal direction X-X, corresponding to the direction A of feeding of the logs 1 from the supply point to the cutting point; transverse direction Y-Y; and vertical direction Z-Z, perpendicular to the other two directions and corresponding to the diametral direction of the logs; as well as an upstream part corresponding to zone for supplying the reels 1 and a downstream part opposite to the preceding part and corresponding to an outlet zone for the rolls R, the machine according to the invention for cutting to size logs 1 fed to the machine by external means shown schematically in the figures with a hopper 10 comprises essentially:

a first conveyor belt 20 endlessly wound on respective rollers 21, at least one of which is a driving roller and the other one an idle roller; the belt 20 rotating about its associated rollers at a first speed V20 by operation of suitable driving means for example of the type with electric motor and encoder;

a pair 30 of second conveyor belts, i.e. lower belt 31 and upper belt 32 in the vertical direction Z-Z, parallel to each other, arranged downstream of the first belt 20; the upper belt 32 is displaceable in both senses of the vertical direction Z-Z from a position relatively far from the lower belt 31 into a position where it is relatively close with suitable compression of the log 1 so as to grip it and cause it to advance without slipping; during the normal operating cycle of the machine the second belts 31, 32 are driven in the feeding direction with an intermittent movement and at a speed VI30 such as to result in a step equivalent to the length in the longitudinal direction of the finished roll;

preferably the pair of belts 30 may be initially driven with a continuous speed so as to cause controlled feeding of the first log to the point for cutting the first leading trim RT and then intermittently for cutting the following rolls and the following logs being machined.

Preferably operation of the first conveyor belt 20 and/or of the second conveyor belt 31, 32 is of the type with electric motor and encoder for calculating the rotation of the belts, connected to a device 500 for programming and controlling the driving of the said belts 31, 32, which in this way is also able to calculate the length of the machined log 1 being fed by the first belt 20 and/or by the belts 30 to the cutting blade 2;

as will emerge more clearly below, the two speeds V20 of the first belt 20 and VI30 of the two belts 30 are such as to cause contact of the front end 1*a* of a log 1 with the rear end 1*b* of the log preceding it along the longitudinal feeding path through the machine downstream of the belt 20;

a rotating cutting blade 2, preferably fixed in the longitudinal direction, and able to be displaced in the vertical direction Z-Z, or for example with an orbital movement, in order to perform the various cuts in the log 1 as required.

Preferably, the cutting blade 2 is arranged between a pair of upstream flanges 41*b* and a pair of downstream flanges 41*a*; the flanges 40 of each pair are situated facing each other in the transverse direction Y-Y. They preferably have a semicircular cross-section and are rotationally movable about a respective pin so as to allow adjustment of the distance in the transverse direction Y-Y suitable for allowing the log to be held during cutting, but allow its free advancing movement in the longitudinal direction X-X. The upstream flanges 41*b* and downstream flanges 41*a* are spaced from each other in the longitudinal direction X-X by an amount such as to allow the entry, for example, in the vertical direction Z-Z, of the said cutting blade 2. The flanges 40 may moreover be preferably configured and/or operated so as to retain and/or compress lightly the roll/log which is being cut, during cutting by the blade 2. According to a preferred embodiment, driving means, comprising for example a servomotor, for one or both the flanges 40 of a pair may operate the respective one or more flanges adjusting the distance in the transverse direction so as to hold and/or compress the log 1 in a manner synchronized with the cutting action of the cutting blade, while allowing the subsequent free advancing movement of the cut roll R/log 1 to be cut.

a third conveyor belt 60 for conveying finished rolls R towards the outlet of the machine;

a device 500 for programming, controlling and commanding the various drives and performing the necessary synchronization for correct management of the machine cycle;

a first photocell 81 connected to the control device 500 and arranged upstream of the second belts 30 in the longitudinal direction X-X and able to detect the code 1*b* of the log 1 and send a corresponding signal to the control device 500;

a second photocell 82, the presence of which is preferred, but not necessary, is able to detect the absence of a log on the conveyor belt 20 and emit a consequent signal, on the basis of which the programming and control device 500 commands stoppage of the machine, operation of which resumes with the arrival of a new log detected by the same photocell 82 or by another of the photocells;

preferably, a third photocell 83, connected to the control device 500, is located at a predefined distance D in the longitudinal direction upstream of the cutting blade 2 and downstream of the first photocell 81 and is able to detect the passing movement of the front end 1*a* of the first log being machined.

According to a preferred embodiment, an optical measuring device (not shown), for example of the laser type, is arranged at a predefined distance in the longitudinal direction from the first, second or third photocell and is able to detect a distance/position from the/of the rear end of a log being machined, for example fed to the first belt 20; when the passing movement of the front end of the log is detected by one of the photocells, the measuring device will provide precise information about the position of the rear end, which allows the control system 500 to determine the actual length of the log being machined, before all the rolls have been cut from it.

The programming/controlling device 500 is able to control the various drives of the machine and in particular is programmed as follows:

depending on the signal emitted by the first photocell 81, which indicates the moment the free rear end 1*b* of a log 1 being machined passes by, the programming device sends a consent signal which activates supplying of a following log 1 to the first conveyor belt 20 and operates, by means of respective driving means, the first conveyor belt 20 and second conveyor belts 30 in the feeding direction and at respective speeds V20, VI30 such as to cause contact between the front end 1*a* of the new log being fed with the rear end 1*b* of the log 1 preceding it along the longitudinal feeding path through the machine;

depending on the same signal from the first photocell and the various stored and/or calculated length values, the control device 500 determines the length of the section of the machined log 1 which is yet to be cut and therefore of the trailing trim (RC) of the same log, which will be present at the end of the cutting of the rolls R not yet cut; as will become clear below, the controller 500 may be programmed to adapt the length of the trailing trim RC of the log 1 being machined, the leading trims RT and/or trailing trims of the following log(s) which have been machined and/or the length L2 of the rolls to be cut, so that the measurement of the rolls and/or the trims is always within the tolerance limits and corresponds to the desired final result.

Preferably the machine further comprises a device for selectively discharging the trims RT and RC of the logs, usually indicated by 100 in FIG. 2;

With this structure the operating principle of the machine is as follows:

the machine is prepared with the programming device activated and set with the specific cutting program for storage of the predefined values of the length dimension L1 of the log 1, L2 of the finished roll R, L3 of leading trim RT and L4 of the trailing trim RC; and if necessary the flanges 40 and the belts 31, 32 are adjusted to a suitable mutual distance depending on the diameter d of the log to be machined;

the three photocells 80 are activated;

the conveyor belts 20, 30, 60 are set in motion at the respective speeds;

the start-of-cycle consent signal is emitted, manually or by the discharge device when it is in a start-of-cycle position, a first log 1 is supplied to the first conveyor belt 20 which causes the log to advance in the longitudinal direction at a speed V20, conveying it to the belts 30 which are driven preferably at a constant speed and which transport it towards the cutting blade 2;

if the optical device for measuring the position of the rear end of the log is present, the control device 500 is able, during transit of the front end of the log underneath one of the photocells 81, 82, 83, to determine the actual length of the fed log being machined, before it reaches the cutting blade;

during its movement towards the cutting blade 2, the front end 1*a* of the first log is intercepted by the third photocell 83 which sends a corresponding signal to the programming device 500 which enables:

the cutting blade 2;

the distance D between the front end 1*a* of the log and the cutting blade 2 being known, the programming device 500 operates the conveyor belts 30 so as to cause the log to advance beyond the cutting blade by an amount equal to the programmed longitudinal length L3 of the leading trim RT to be cut;

since the programming and control device 500 is connected to the drive with encoders of the belts 30 (and to the third photocell 83), it is able to determine with precision the length of the machined log section 1 being fed by the said belts 30 and, if necessary, synchronize the descent of the cutting blade 2 with this advancing movement;

once the first cut of the leading trim RT has been performed the programming device 500 changes from continuous to intermittent the driving of the pair of the feed belts 30 and sets intermittent feeding for sections with a length such as to carry out cutting to the size L2 set for each roll R. Preferably cutting is performed with the log stationary; during the passage of the log 1 and upon cutting thereof into rolls, the rear end 1*b* of the log passes underneath the first photocell 81 which detects it and sends the corresponding signal to the programming device 500;

the programming device 500 enables supplying of a following log 1 to the first conveyor belt 20 which causes it advance at a speed V20 in the direction of the pair of belts 30;

the various drive modes, i.e. continuous with speed V20 of the first belt 20 and intermittent in keeping with the speed VI30 of the second conveyor belt 30, ensure that the second log reaches the first log, resulting in contact between its front end 1*a* and the rear end 1*b* of the downstream log 1; from this moment the two logs continue to advance, joined together, in contact with each other, in the longitudinal direction X-X;

the advancing movement of the logs brings the leading trim RT of the first log cut into rolls R to the discharge zone where the trim is discharged from the machine by means of the discharging device 100;

the advancing movement of the two logs 1 in contact with each other, following the roll cutting sequence, brings the trailing trim RC of the front log to the cutting point;

the programming device 50, depending on the signal received from the first photocell 81 located at a known distance from the cutting blade and/or from the third photocell 83 (as well as the length of the log already fed to the cutting blade and/or the predefined length L2 of the rolls R), determines the actual overall length of the log 1 being machined and/or the length of the trailing trim RC of the log 1 being machined which will occur at the end of the operations for cutting the predefined number of rolls R of predefined length L2; if the optical measuring device is present, these parameters will instead already be known to the control device 500;

preferably cutting of the log into rolls R is performed depending on the count of the number of programmed cuts needed to obtain the predefined number of finished rolls R of predefined length L2 from the said log 1;

the programming and control device 500, taking into account the fact that the trailing trim RC has already been cut and the leading trim RT of the following log is in contact with the trailing trim RC of the preceding log, causes the two logs to advance by only the sum of the length of the two trims (RC+RT), bringing the trim RT of the following log to the cutting blade 2;

with a single cut, therefore, the two free trims RC and RT are obtained, but in contact with each other;

continuing the advancing movement of the logs with the following cutting-to-size of the rolls R, the two trims RC+RT reach the discharge zone, which in the meantime has been prepared for discharging, and where, with the log stationary or advancing, said trims are discharged from the machine;

once discharging has been performed, the unit 500 restores the feeding path of the cut-to-size rolls R which continue on the belt 60 to the following stations where the packaging operations are carried out.

If the machined log has a length corresponding to the nominal length L1 set for the machining cycle, the length of the trailing trim RC of the log 1 being machined cut controllably by the programming and control device 500 corresponds to the preset value L4. In this case, the values of the feeding and cutting parameters (length of the leading trim RT, length of the trailing trim RC, length of the roll R to be cut) will remain unchanged for the operations to be carried out on the next log 1 to be machined.

If the programming and control device 500 determines instead that the machined log has an overall length different from the nominal set length L1, it may be programmed to adapt correspondingly one or more values of the set parameters, depending on a given preferred final result set for the logs to be machined.

If the optical measuring device for detecting the position of the rear end of the machined log is present, the control device 500 may calculate the actual length of the machined log before the operations for cutting rolls R and trims RT, RC from it are started or at least concluded; therefore, with this configuration, the control and programming device 500 may be programmed to vary one or more value of the set parameters (including the length of the leading trim RT) already on the machined log.

Fixed Roll Length

According to a first preferred example of configuration of the controller 500, it must be set to ensure, for each log being machined, the predefined length L2 of each cut roll; this condition is generally that which is preferred, in particular since typically the dimensions of the final packages inside which the cut rolls must be packaged are fixed.

According to an example of this preferred embodiment, the controller 500 is programmed to distribute the difference DT between the measured length of the log being machined and the preset nominal length L1, over one of or both the leading trim RT and the trailing trim RC of the next log; preferably the programming device 500 commands therefore a cut of the leading trim RT of the next log 1 equal to the predefined length L3 plus half said difference in length (L3new=L3old+(DT/2)).

Fixed Trim Length

According to a further example of a preferred configuration of the controller 500, said device is set to ensure, for each log being machined, a predefined length L3 of each leading trim RT and/or L4 of the trailing trim RC of the next log to be machined.

According to an example of this preferred embodiment, the controller 500 is programmed to distribute the difference DT between the actual measured length of the log being machined and the preset nominal length L1, over one or more rolls, and preferably uniformly over all the rolls N to be cut from the next log 1 to be machined.

This solution may be preferred when the difference in length L2 of the resultant cut rolls remains within a tolerance range (usually a few millimetres) such as to not negatively affect the packaging thereof.

Adaptation of the Trims and Rolls so as to Obtain an Extra Roll

According to a further embodiment, the controller 500 may be configured to apply both the correction criteria illustrated above, for example in the case where the different DT between the actual length of the machined log 1 and the nominal set length L1 is such as to allow a greater number of cut rolls to be to be obtained from the next log 1 to be machined (which assumes a length equal to that which has just been machined).

In this case, the programming and control device 500 may vary both the set length L3; L4 of the leading and/or trailing trims RT, RC and the length L2 of the cut roll R, which lengths must in any case remain within predefined tolerance values in order to obtain from the next log 1 to be machined an additional cut roll R.

If the optical measuring device is present, one or more of the adjustments described may be carried out already on the log being machined, in particular already on the leading trim RT thereof.

The choice of program or criteria to be applied may be preset such that the control device 500 performs it automatically or may in each case be approved by an operator.

It is therefore clear how with the machine according to the invention it is possible to perform continuous sequential machining of the logs to be cut.

In addition, the machine according to the invention results in an overall simplification of parts owing to:

elimination of the transportation chain and the entire associated drive mechanism and the vane devices for longitudinally pushing the log with elimination of the empty longitudinal spaces between two logs, thus resulting in a reduction of the machine downtime and an increase in the hourly production rate;

continuous feeding of the logs to the cutting blade which, in turns, does not require associated longitudinal movement and control instruments;

elimination of log deformation during cutting of the trims, thus resulting in a product which is stronger and the possibility of reducing the trim size;

guarantee of a final product which is always within the desired tolerance values and/or less wastage of material.

According to a preferred embodiment the device 100 for selectively discharging the trims RC and RT of the logs 1 comprises:

a connecting element 150 arranged downstream of the cutting blade 2 in a zone S for discharging the trims and displaceable, along a guide 151, in the longitudinal direction X-X from a position close to the downstream flanges 41*a*, if present, corresponding to a condition of substantial closure of the discharge zone, to a position spaced therefrom, corresponding to a condition of bottom opening of the discharge zone and vice versa.

Preferably and as shown in FIG. 14, the connecting element 150 is formed by two half-plates 150*a*, 150*b* with a convex curved profile, situated opposite each in the transverse direction and hinged at the top along a respective guide 151, the closing/opening rotation of which is adjustable and designed to cause opening in the transverse direction substantially corresponding to the outer diameter of an advancing roll R so that said roll may be guided, without obstacles, when passing through the said connecting element in the longitudinal direction X-X and so as not to drop in the vertical direction Z-Z into the discharging zone.

With this configuration the machine is configured so that cut rolls/trims pass through the discharge zone by means of pushing force of the following log/rolls.

As shown in FIG. 14, the two half-plates extend in the vertical direction such as to avoid dropping, by means of gravity, of the rolls R which pass through the connecting element, in particular extend at least over more than half the outer diameter of the said rolls in the vertical direction, so as to surround the rolls in transit by the amount needed to prevent them dropping, but sufficient to allow easy feeding thereof in the longitudinal direction.

a third conveyor belt 160 for transporting cut rolls R towards the outlet of the machine arranged downstream of the connecting element 150; preferably, the third conveyor belt 160 is arranged lowered by a few millimetres in the vertical direction Z-Z relative to the bottom edge of the connecting element 150;

a fourth conveyor belt 170 for transporting the discharged trims, arranged underneath the discharge zone. With this structure and with reference to FIGS. 7-13, the operating principle of the discharging device is as follows:

once cutting of the leading trim RT of the first log 1 has been performed as described above, the programming device:

changes from continuous to intermittent the driving of the pair of the feed belts 30 and sets intermittent feeding for sections with a length such as to ensure cutting to the size set for each roll R;

enables displacement of the connecting element 150 into the spaced position for opening of the discharge zone S;

during the passage of the log 1 and upon cutting thereof into rolls, the rear end 1*b* of the log passes underneath the first photocell 81 which detects it and sends the corresponding signal to the programming device 500;

the programming device 500 enables feeding of a following log 1 to the first conveyor belt 20 which causes it advance at a speed V20;

the various drive modes, i.e.: continuous with speed V20 of the first belt 20 and intermittent in keeping with the speed VI30 of the second conveyor belt 30, ensure that the second log reaches the first log, resulting in contact between its front end 1*a* and the rear end 1*b* of the downstream log 1; from this moment the two logs continue to advance in contact with each other;

the log advancing movement brings, under the pushing force of the following cut rolls/log, the leading trim RT of the first log cut into rolls R to the discharge zone where the connecting element 150 is already positioned in the open condition (upon command of the controlling device 500) so as to allow the trim RT to fall out from the machine by means of gravity;

once the leading trim RT has been discharged, the connecting element is operated so that the discharge zone S is closed by the control device 500;

the advancing movement of the two logs 1 in contact with each other, following the roll cutting sequence, brings the trailing trim RC of the front log to the cutting point;

the programming device 500, taking into account the fact that the trailing trim RC has already been cut and the leading trim RT of the following log is in contact with the trailing trim RC of the preceding log, causes the two logs to advance by only the sum of the length of the two trims (RC+RT) to be cut, bringing the leading trim RT of the following log to the cutting blade 2;

with a single cut, therefore, the two free trims RC and RT are obtained, but remain in contact with each other;

since the programming device 500 knows the position of the discharge zone S with respect to the position of the cutting blade, the two trims RC+RT are made to advance, pushed by the following log, until they arrive in the discharge zone S where, with the log stationary or moving, the programming device 500 displaces/has displaced the connecting element 150 so as to open by an amount and for sufficient time to cause only the cut trims RT+RC to drop in the vertical direction by means of gravity onto the conveyor belt 170 of the open discharge zone S;

once discharging of the trims has been performed, the connecting element 150 is operated so as to close again the discharge zone, restoring the feeding path of the cut-to-size rolls R which continue on the belt 160 to the following stations where the packaging operations are carried out.

In addition to that described above, the machine also allows rapid changing of the format when there is a variation in the lengths of the logs and the lengths required for the finished rolls, and/or the leading trims and/or trailing trims, without the need for structural modification of parts of the machine, as occurs in the prior art. This is particularly easy with the preferred discharging device, which allows a rapid change of format, determined only by a different length of the displacement path of the connecting element 150, when there is a variation in the lengths of the trims to be discharged and/or the lengths required for the finished rolls.

In addition to the advantages described above, the machine according to the invention allows, also in the complete form of a trim discharge device, an easy and rapid change of format when there is a variation in the diameter d of the logs being machined, without the need for structural modification of parts of the machine as occurs in the prior art.

The structural simplicity of the machine is also such that the overall dimensions and the production and assembly times and costs may be reduced, being able to be easily installed at the location of end users.

Although described in connection with a number of embodiments and a number of preferred examples of implementation of the invention, it is understood that the scope of protection of the present patent is determined solely by the claims below.

The invention claimed is:

1. Machine for cutting to size rolls (R) with a defined length (L2) from logs having a greater length (L1), comprising:

a first conveyor belt (20) which can be driven so as to convey a log (1) advancing in a longitudinal direction (X-X);

a programming and control device (500) for controlling and commanding operating drives and performing necessary synchronization for correct management of a machine cycle;

a pair (30) of second conveyor belts having a bottom belt (31) and a top belt (32) which are parallel to each other and arranged downstream of the first belt (21) in the longitudinal direction (X-X);

a cutting blade (2), downstream of the second conveyor belts (30), which can be rotationally driven and which is fixed in the longitudinal direction and movable in a vertical direction (Z-Z);

a third conveyor belt (60) for conveying finished rolls (R) towards a machine outlet;

a first photocell (81) connected to the programming and control device (500) and arranged upstream of the second conveyor belts (30) in the longitudinal direction (X-X), for detecting passage of a rear end (1*b*) of a log (1) being machined and sending a respective signal to the programming and control device (500);

wherein the programming and control device (500) is configured to command feeding of a new log to be machined to the first conveyor belt (20), depending on said signal emitted by the first photocell (81); and wherein the programming and control device (500) is configured to control driving in a feeding direction of the first belt (20) at a first speed (V20) and of the second belts (31, 32) with respective speeds (V20, VI30), such as to cause contact of a front end (1*a*) of a new log (1) to be machined with the rear end (1*b*) of the log preceding it along the feeding direction through the machine.

2. The machine according to claim 1, further comprising a third photocell (83) connected to the programming and control device (500) and situated downstream of the first photocell (81) at a predefined distance (D) in the longitudinal direction upstream of the cutting blade (2), for detecting the passage of the front end (1*a*) of the log being machined;

wherein the programming and control device (500) is configured to control driving of the second pair of conveyor belts (30) for controlled feeding of the first log (1) being machined beyond the cutting blade (2) for cutting a leading trim (RT) thereof, depending on the signal of the third photocell and said known distance (D).

3. The machine according to claim 1, wherein the movement of the second pair of belts (30) is intermittent; or wherein the movement of the second pair of belts (30) is continuous so as to cause feeding of the first log supplied to the machine as far as cutting of the leading trim (RT) of the first log (1); and/or wherein the movement of the second pair of belts (30) is intermittent so as to cause feeding of the first log after cutting of the leading trim (RT) and feeding of the logs following the first log and is such as to define a step equivalent to the length (L2) set for each finished roll (R) in the longitudinal direction.

4. The machine according to claim 1, wherein the programming and control device (500) is configured to calculate the length of the log being machined and/or of the trailing trim (RC) of the log being machined depending on a signal emitted by the first photocell (81), and to adapt driving of the second belts (30) for the logs (1) being fed so as to determine an adaptation of the length of the trailing trim (RC) of the log (1) being machined, and/or of the leading trim (RT) and/or trailing trims (RC) and/or of the length (L2) of the rolls to be cut from the following machined log(s).

5. The machine according to claim 1, wherein it further comprises a second photocell (82) for detecting when there is no log present on the conveyor belt and emitting a corresponding signal for stopping the machine and/or in that it comprises an optical measuring device, preferably of the laser type, arranged at a predefined distance in the longitudinal direction (X-X) from one of the photocells (81;82;83) and able to detect the distance/position of the trailing end of a log being machined.

6. The machine according to claim 1, wherein the top belt (32) of the pair of second belts (30) is displaceable in both senses along the vertical direction (Z-Z) between a remote position spaced from the bottom belt (31) and a position close thereto for suitably compressing a log (1) for gripping and slip-free feeding thereof in the longitudinal direction.

7. The machine according to claim 1, further comprising a pair of upstream flanges (41*b*) and a pair of downstream flanges (41*a*), the flanges (40) of each pair being arranged opposite each other in the transverse direction (Y-Y) and having a semi-circular cross-section; wherein the pair of upstream flanges (41*b*) and the pair of downstream flanges (41*a*) are spaced from each other in the longitudinal direction (X-X) by an amount such as to allow the entry of the cutting blade (2).

8. The machine according to claim 7, wherein in that the flanges (40) are movable rotationally about a respective pivot so as to adapt to the diameter of the log (1) and prevent deformation of the roll (R) during cutting and allow the feeding movement of the rolls in the longitudinal direction (X-X) through the flanges (40).

9. The machine according to claim 1, wherein the machine further comprises a device (100) for selectively discharging the leading trims (RT) and trailing trims (RC) cut from the logs (1), arranged downstream of the cutting blade (2).

10. The machine according to claim 9, wherein the selective discharging device (100) comprises:

a connecting element (150) arranged downstream of the cutting blade (2) in a discharge zone (S) for discharging the trims, the connecting element (150) being displaceable on a guide (151) in the longitudinal direction (X-X) from a position for closing the discharge zone (S), where the connecting element (150) allows transit of the cut rolls (R) in the longitudinal direction, to a position remote from the cutting blade for opening said discharge zone to allow the trims (RT+RC) to drop, and vice versa;

a conveyor belt (170) arranged underneath the discharge zone for receiving and conveying away the trims which have dropped.

11. The machine according to claim 10, wherein the connecting element (150) is formed by two half-plates (150*a*,150*b*) with a convex curved profile arranged opposite each other and hinged at the top along a respective guide (151) and designed to close so as to leave an opening substantially corresponding to the external diameter of an advancing roll (R), so that it may be guided when passing through the connecting element in the longitudinal direction (X-X) and not fall in the vertical direction (Z-Z) into the discharge zone.

12. The machine according to claim 10, wherein the programming and control device (500) is configured to command said displacement of the connecting element (150) over a length greater than or equal to the longitudinal length of the sum of the lengths of the trailing (RC) and leading (RT) trims and smaller than the length of a cut roll (R) and for a suitable period of time depending on the cycle parameters of the machine.

13. The machine according to claim 10, wherein the machine further comprises a third conveyor belt (160) arranged downstream of the connecting element (150) for conveying cut rolls (R) towards the outlet of the machine.

14. The machine according to claim 10, wherein the movement of the connecting element (150) for opening/closing the discharge zone is synchronized by the programming and control unit (500) with the speed of advancing movement of the first and second conveyor belts (20,30) feeding the logs (1) and/or is controlled depending on the distance between the cutting blade (2) and the closing position of the connecting element (150) and/or the calculation of the number of cut rolls (R) with length (L2) and/or the number of logs (1) fed to the cutting blade (2); and/or wherein the opening movement of the discharge zone is controlled by a signal generated by the programming and control device (500) depending on cutting of the leading trim (RT) and/or trailing trim (RC) of the log being machined.

15. Process for cutting to size rolls (R) with a defined length (L2) from logs having a greater length (L1), comprising the following steps:

supplying a first log (1) to be machined to a first conveyor belt (20) for conveying logs along a longitudinal direction (X-X);

conveying the first log (1) by said first conveyor belt (20) to a pair (30) of second conveyor belts having a bottom belt (31) and a top belt (32) which are parallel to each other and arranged downstream of the first conveyor belt (20) in the longitudinal direction (X-X);

taking-up of the first log (1) by the second conveyor belts (30) and conveying thereof to a cutting blade (2) which can be rotationally driven and which is fixed in the longitudinal direction and movable in a vertical direction (Z-Z);

cutting a leading trim (RT) of predefined length (L3) from the first log (1) by the cutting blade (2);

controlled feeding of the first log (1) to the cutting blade (2) by the second conveyor belts (30), with sequential cutting of rolls (R) of predefined length (L2);

detecting passage of a rear end (1*b*) of the first log (1) by a first photocell (81) arranged upstream of the second belts (30) in the longitudinal direction (X-X) and connected to a programming and control device (500) for controlling and commanding various operating drives and performing necessary synchronization for correct management of the process;

sending a respective signal for detection of the passage of the rear end (1*b*) of the first log (1) by the first photocell (81) to the programming and control device (500);

supplying a new log to be machined to the first conveyor belt (20), commanded by the programming and control device (500) based on said signal emitted by the first photocell (81);

driving the first belt (20) at a first speed (V20) in a feeding direction and the second belts (31, 32) at respective speeds (V20, VI30) such as to cause contact of a front end (1*a*) of the new log (1) to be machined with the rear end (1*b*) of the first log preceding it along a longitudinal feeding path through the machine;

conveying cut rolls (R) towards a machine outlet.

16. The process according to claim 15, comprising further steps of:

detecting passage of a front end (1*a*) of the first log being machined by a third photocell (83) connected to the programming and control device (500) and situated downstream of the first photocell (81) at a predefined distance (D) in the longitudinal direction upstream of the cutting blade (2);

wherein driving of the second pair of belts (30) for feeding the first log being machined beyond the cutting blade (2), in order to cut the leading trim (RT) thereof, is controlled depending on a detection signal sent by the third photocell (83) and said known distance (D).

17. The process according to claim 15 wherein the movement of the pair of second conveyor belts (30) is intermittent; or the movement of the second conveyor belts (30) is continuous so as to cause feeding of the first log supplied to the machine as far as cutting of the first leading trim (RT); and/or wherein the movement of the pair of second conveyor belts (30) is intermittent so as to cause feeding of the first log after cutting of the leading trim (RT) and feeding of the logs following the first log and is such as to define a step equivalent to the length (L2) in the longitudinal direction set for the finished roll (R).

18. The process according to claim 15, wherein the programming and control device (500) is configured to calculate the length of the roll being machined and/or of the trailing trim (RC) of the machined log depending on the signal emitted by the first photocell (81) and to adapt driving of the belts (30) for the advancing logs (1) so as to determine an adaptation of the length of the trailing trim (RC) of the log (1) being machined and/or of the leading trim (RT) and/or trailing (RC) trims and/or of the length (L2) of the rolls to be cut from the following machined log(s).

19. The process according to claim 15, wherein the the process is stopped if a second photocell (82) detects that there is no log present on the conveyor belt.

20. The process according to claim 15, wherein said step of taking-up of the log (1) being machined by the pair of second conveyor belts is carried out by displacing a conveyor belt (32) of the pair of second belts (30) in the vertical direction (Z-Z) from a remote position spaced from the other belt (31) to a position close thereto for suitably compressing the log (1) being machined, and in that slip-free feeding, in the longitudinal direction, of the log (1) being machined is carried out by rotationally driving said pair of second conveyor belts (30).

21. The process according to claim 15, wherein in the cutting step, the log (1) being machined is kept in position by a pair of upstream flanges (41*b*) and by a pair of downstream flanges (41*a*), the flanges (40) of each pair being arranged opposite each other in the transverse direction (Y-Y) and having a semi-circular cross-section; wherein the upstream flanges (41*b*) and the downstream flanges (41*a*) are spaced from each other in the longitudinal direction (X-X) by an amount such as to allow the entry of the cutting blade (2).

22. The process according to claim 15 further comprises a step of selectively discharging the leading trims (RT) and/or trailing trims (RC) cut from the logs (1), downstream of the cutting blade (2), by of a selective discharging device (100), wherein the selective discharging device comprises a connecting element (150) arranged downstream of the cutting blade (2) in a trim discharge zone (S), and wherein, in order to perform discharging, the connecting element (150) is displaced in the longitudinal direction (X-X) from a position for closing the discharge zone (S), where the connecting element (150) allows transit of the cut rolls (R) in the longitudinal direction, into a position, remote from the cutting blade, which causes opening of said discharge zone and dropping of the trims (RT+RC) onto a conveyor belt (170) arranged below the discharge zone which receives and evacuates the dropped trims; wherein preferably said displacement of the connecting element (150) is performed over a length greater than or equal to the longitudinal length of the sum of the lengths of the two trailing (RC) and leading (RT) trims and smaller than the length of a cut roll (R) and for a period of time depending on the machine cycle parameters.

23. The process according to claim 22, wherein the step of transportation of cut rolls (R) towards the outlet of the machine is performed by arranging the connecting element (150) in the position for closing the discharge zone, where the cut rolls are guided through the connecting element in the longitudinal direction X-X without dropping in the vertical direction Z-Z into the discharge zone and reach a third conveyor belt (60) which transports them towards the outlet.

24. The process according to claim 15, wherein the cut rolls and/or the trims to be discharged are transported in the longitudinal feeding direction by means of the pushing force of the cut rolls and the log being machined which precede them in the longitudinal direction (X-X).

* * * * *